United States Patent
Anglin et al.

(10) Patent No.: US 8,547,350 B2
(45) Date of Patent: Oct. 1, 2013

(54) FLOATING PLANE TOUCH DETECTION SYSTEM

(76) Inventors: Noah L. Anglin, San Jose, CA (US);
Krystyna Maliniak, San Francisco, CA (US)

( * ) Notice: Subject to any disclaimer, the term of this patent is extended or adjusted under 35 U.S.C. 154(b) by 710 days.

(21) Appl. No.: 12/707,530

(22) Filed: Feb. 17, 2010

(65) Prior Publication Data
US 2010/0207906 A1 Aug. 19, 2010

Related U.S. Application Data

(60) Provisional application No. 61/207,775, filed on Feb. 17, 2009.

(51) Int. Cl.
*G06F 3/041* (2006.01)
(52) U.S. Cl.
USPC ........ 345/173; 345/174; 345/104; 178/18.01; 178/18.05
(58) Field of Classification Search
USPC .............. 345/173, 174, 178, 104; 178/18.01, 178/18.05; 463/37
See application file for complete search history.

(56) References Cited

U.S. PATENT DOCUMENTS

| | | | |
|---|---|---|---|
| 4,511,760 A | 4/1985 | Garwin | |
| 4,558,757 A | 12/1985 | Mori | |
| 4,918,262 A | 4/1990 | Flowers | |
| 5,038,142 A | 8/1991 | Flowers | |
| 5,241,308 A * | 8/1993 | Young | 341/34 |
| 5,541,372 A | 7/1996 | Baller | |
| 5,854,625 A * | 12/1998 | Frisch et al. | 345/173 |
| 7,176,897 B2 * | 2/2007 | Roberts | 345/173 |
| 7,312,791 B2 * | 12/2007 | Hoshino et al. | 345/173 |
| 7,532,202 B2 | 5/2009 | Roberts | |
| 7,545,365 B2 * | 6/2009 | Kent et al. | 345/173 |
| 7,671,849 B2 * | 3/2010 | Takei et al. | 345/173 |
| 8,026,906 B2 * | 9/2011 | Molne et al. | 345/174 |
| 2002/0163509 A1 | 11/2002 | Roberts | |

(Continued)

FOREIGN PATENT DOCUMENTS

| | | |
|---|---|---|
| KR | 10-0894250 B1 | 4/2009 |
| WO | WO 2008030594 A2 * | 3/2008 |
| WO | WO-2008115408 | 9/2008 |

OTHER PUBLICATIONS

International Search Report; Oct. 13, 2010.

*Primary Examiner* — Lun-Yi Lao
*Assistant Examiner* — Kelly B Hegarty
(74) *Attorney, Agent, or Firm* — Sawyer Law Group, P.C.

(57) ABSTRACT

A force/displacement touch device, this invention employs a base-plane 32 and flexible mounting material to suspend, or "float," a non-rigidly mounted touch-plane 12, and uses sensors at each mounting point 22 to measure Z-axis deflection of the floating touch-plane 12. The system adapts existing planes in typical LCD assemblies to implement touch screens. This floating touch detection system provides an accurate, sensitive, compact and low-cost solution. It mitigates XY friction to improve detection of Z-forces. This approach provides latitude in locating sensors 34, allows for additional mid-plane sensors, enables greater accuracy and resolution, and adds features such as "multi-touch" sensitivity. This touch system is defined as a unique and novel 'floating' co-planar assembly of a touch-plane 12 to a base-plane 32, which uses a flexible material 22 or medium to define a consistent resting air gap, and then senses and measures any deflection from the co-planar resting position, using any among a broad variety of sensor types.

9 Claims, 7 Drawing Sheets

(56) References Cited

U.S. PATENT DOCUMENTS

| | | | |
|---|---|---|---|
| 2002/0175836 A1* | 11/2002 | Roberts | 341/34 |
| 2005/0156904 A1* | 7/2005 | Katayose | 345/173 |
| 2005/0168449 A1* | 8/2005 | Katayose | 345/173 |
| 2005/0253643 A1* | 11/2005 | Inokawa et al. | 327/517 |
| 2006/0071911 A1* | 4/2006 | Sullivan | 345/173 |
| 2006/0071912 A1* | 4/2006 | Hill et al. | 345/173 |
| 2006/0227114 A1* | 10/2006 | Geaghan et al. | 345/173 |
| 2006/0279548 A1* | 12/2006 | Geaghan | 345/173 |
| 2008/0234044 A1* | 9/2008 | Aida | 463/37 |
| 2009/0115734 A1* | 5/2009 | Fredriksson et al. | 345/173 |
| 2009/0128503 A1* | 5/2009 | Grant et al. | 345/173 |
| 2009/0140996 A1* | 6/2009 | Takashima et al. | 345/173 |
| 2009/0231292 A1* | 9/2009 | Hsieh et al. | 345/173 |
| 2010/0045612 A1* | 2/2010 | Molne | 345/173 |
| 2010/0053854 A1* | 3/2010 | Nishikawa et al. | 361/679.01 |
| 2010/0117989 A1* | 5/2010 | Chang | 345/175 |
| 2010/0177050 A1* | 7/2010 | Heubel et al. | 345/173 |
| 2010/0177057 A1* | 7/2010 | Flint et al. | 345/174 |

\* cited by examiner

FLOATING PLANE TOUCH DETECTION SYSTEM

CROSS-REFERENCE TO RELATED APPLICATIONS

This application claims the benefit of U.S. Provisional Application No. 61/207,775 filed Feb. 17, 2009.

BACKGROUND

Touch devices have become increasingly common with technological improvements in communication devices, which require user interface improvements. Various ways of detecting and interpreting touch have been explored for the last fifty years. Today, touch screens are used in a variety of devices, small (cell-phones and PDAs), medium (laptops, monitors, ebooks), large (POS terminals, kiosks and ATMs) and even very large touch panels (over 1 meter) for rugged environments. Across the spectrum of touch screen devices, flat panel displays are popular, especially LCDs. But touch devices have been plagued by various mechanical problems that still present a challenge to engineers and manufacturers.

DESCRIPTION OF PRIOR ART

The concept of locating a touch point by recording the applied force was researched and documented initially by IBM, over 30 years ago. The most common force-based touch device consists of a rigid touch plane, at least 3 sensors, another rigid surface to which the sensors are attached and a mounting mechanism to keep the sensors flat. The sensors are connected to an A/D, which in turn is connected to a processor/microcontroller. As the user presses on the touch plane with finger or stylus, the sensors detect the exerted force and measure it. The analog signals received by the sensors are then sent to the processor, which calculates the location of the touch (X-Y) and the amount of the exerted force. A mechanism is also needed to insure that a touch produces a force along the Z-axis only, and that any extraneous forces in the direction of the X-Y axes are countered to the greatest possible degree.

U.S. Pat. No. 5,038,142 to Flower (IBM) issued Aug. 6, 1991 shows a touch sensing display screen supported by stiff springs having essentially uni-axial freedom of motion. Strain gauge sensors are applied directly to the springs and a processor calculates the X, Y and Z coordinate information. This device uses a spring to achieve Z-axis input. However, the device never achieved commercial success and is not on the market any longer. It's possible, that the lateral forces caused a problem.

U.S. Pat. No. 7,176,897 to Roberts (3M), issued Jan. 2, 2007, describes a method and a system to correct one or more sensor signals having errors induced by a viscoelastic effect. This effect, method and system are provided to correct inaccuracies in touch location determination associated with mechanical distortion of the touch screen. Calibration parameters are provided for a touch screen characterizing an error in an expected touch signal associated with mechanical distortion of the touch screen.

International Patent Publication WO/2008/115408 to Brown (F-Origin), published Sep. 25, 2008, introduces a suspension system for a differential-pressure touch sensitive panel suspended over force sensors to be used in a variety of devices. In this invention each side of the glass lens is connected with a looped string, monofilament or flexible wire, which is then looped around the back cover or base plate, forming a figure-8. The figure 8 loops bring the lens into a fixed state in the X-Y plane. The string holds the two plates together, presenting a force to the four sensors. This invention, although an improvement in the area of force-based touch devices, may be difficult to manufacture, taking under consideration the string, stringing and additional pieces required to make it work.

Force-based touch devices are prone to certain specific types of problem or failure. Among others, the following problems have plagued many implementations of force-based touch devices: extremely small tolerances required for the mechanical build-up; friction and other interfering lateral forces are common, and difficult to detect and counter; extraneous items required to accomplish a "touch" surface, such as extra planes, strings and films, are expensive and difficult to manufacture; extraneous items take up space (for example, in an LCM stack-up), and add cost; a complicated mechanism may be required to keep the touch surface and the bottom surface co-planar; low accuracy and low sensitivity issues due to the interfering forces.

Rather than using a force-based approach, touch screens for LCD Modules (LCMs) have also employed "capacitive" or "resistive" technology. Touch screens produced this way have certain limitations, such as a costly "layer" of film over their displays in order to provide feedback information. Adding various layers to the devices adds to their cost and limits transmissivity of the display, thus diminishing the quality of the transmitted image.

BRIEF SUMMARY OF THE INVENTION

A force/displacement touch device, this invention employs a base-plane and flexible mounting material to "float" a non-rigidly mounted touch-plane, and uses sensors at each mounting point to measure Z-axis deflection of the floating touch-plane. The system adapts existing planes in typical LCD assemblies to implement touch screens. This floating touch-plane system provides an accurate, sensitive, compact and low-cost solution. It mitigates XY friction to improve detection of Z-forces. This approach provides latitude in locating sensors, allows for additional mid-plane sensors, enables greater accuracy and resolution, and adds features such as "multi-touch" sensitivity.

This touch input device is defined as a unique and novel 'floating' co-planar assembly of a touch-plane to a base-plane, which uses a flexible material to define a consistent resting air gap, and then senses and measures any deflection from the co-planar resting position, using any among a broad variety of sensor types.

DETAILED DESCRIPTION OF THE INVENTION

The floating plane system introduced here uses a flexible mounting material (medium) to suspend or "float" the touch surface in a manner that accommodates XY friction and improves detection of the Z-force.

It provides for wider "co-planar" tolerances, simplifying the manufacturing process. For example, a plane is defined by three points, while typical touch screens are mounted at four corners, and in ever-thinner designs. Thinner designs dictate ever-smaller touch deflection differences. Any design attempting to separate touch and sensor planes at four points must calibrate those four mounting points (frequently force sensors) with extreme precision, making the necessary tolerances increasingly manufacturing-intensive.

It uses non-contact sensors that measure the vertical displacement of the touch surface, again diminishing unwanted lateral forces usually present in force-based devices.

The system can adapt existing planes within a typical LCD display assembly, and avoid adding films or extra major components when implementing the touch screen.

It adds very little to the vertical "stack-up" (vertical depth) of the device, thus enabling even thinner device implementations.

It permits using various numbers and locations of sensors, enabling higher levels of detection accuracy, screen resolution, and enabling multi-touch sensitivity.

It permits 100% image transmission to the display device, since it does not require any film covering the display screen.

BRIEF DESCRIPTION OF DRAWINGS

FIG. 1: This is a top side perspective view of a touch screen implementation. It shows the touch-plane 12 is an adaptation of the twin-plane LCD/Backlight assembly. The base-plane 32 is an adaptation of the existing PCBA. This exploded view reveals essential components, the flexible mounts 22, sensors 34 and targets 35. Sensor pairs 34/35 are shown clearly.

LEGEND OF REFERENCE NUMERALS

12 Touch-plane
22 Flexible mounts
32 Base-plane
34 Sensor
35 Sensor Target

INTERNATIONAL LEGEND OF REFERENCE NUMERALS (12) Touch-plane
(22) Flexible mounts
(32) Base-plane
(34) Sensor
(35) Sensor Target

DETAILED DESCRIPTION OF THE DRAWINGS

Figure 1:
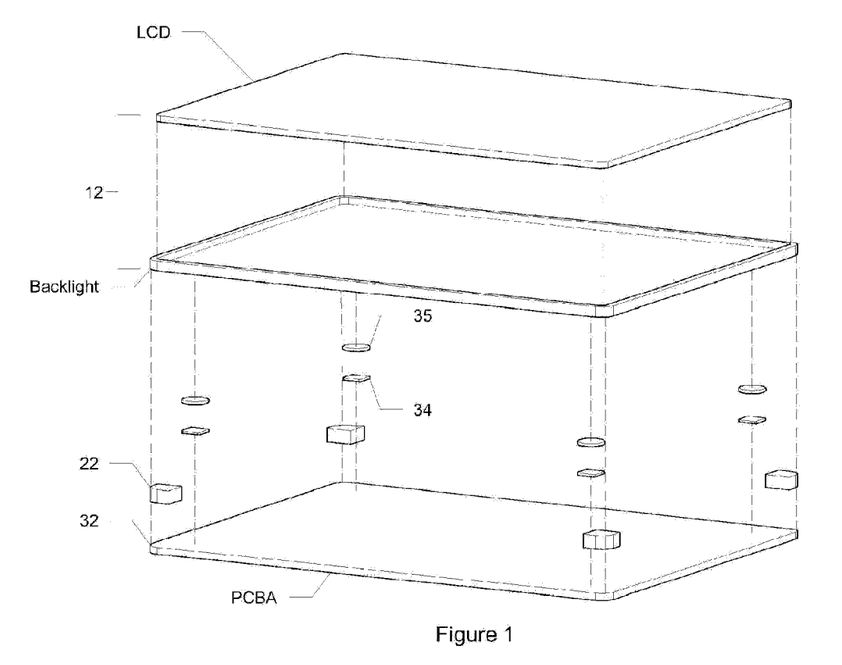
Figure 2:
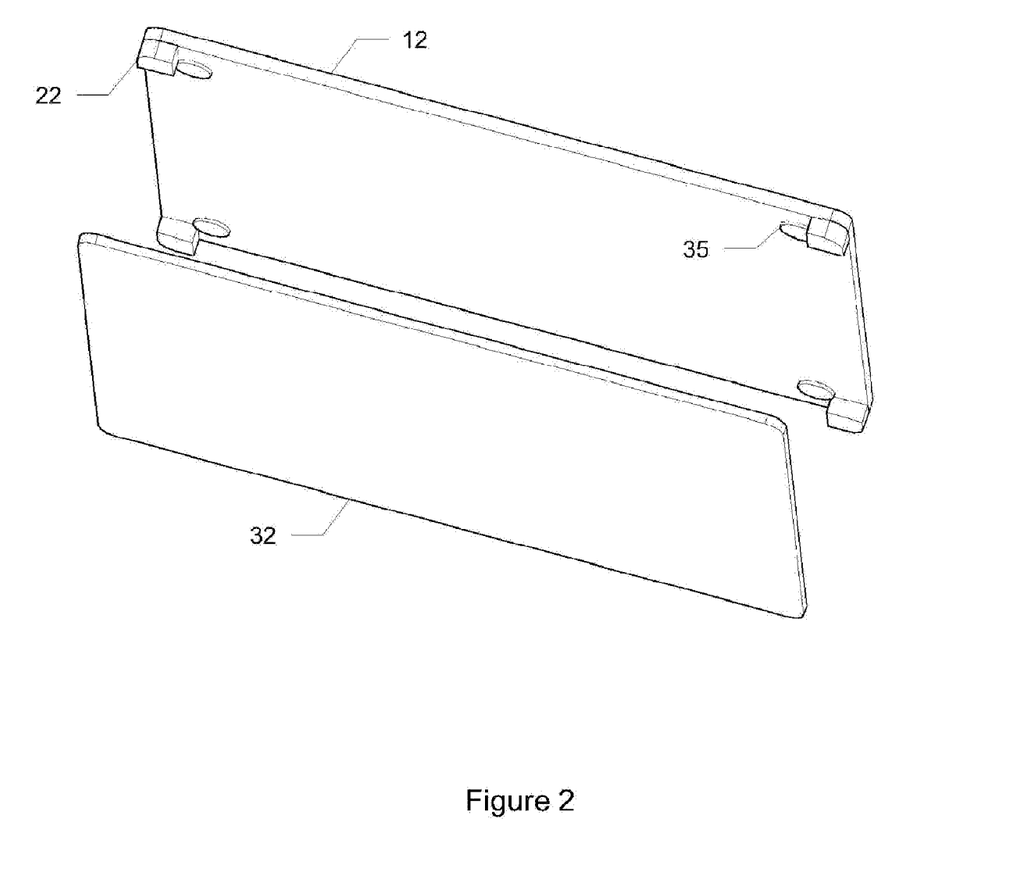
FIG. 2: This bottom side exploded perspective view of the touch screen implementation shows the LCD/Backlight assembly, with flexible mounts, "lifted" away from the PCBA.

FIG. 1 and FIG. 2 illustrate a floating touch-plane implementation as a touch screen. FIG. 1 clearly depicts the four (4) essential components specified by this invention. It shows how a touch screen may be implemented by adding specific minor components to a typical LCD display assembly (i.e., LCD display, backlight, and PCBA), while adapting the use of its existing major planes.

The broadest definition of this touch input device is: A unique and novel co-planar assembly of a "floating" touch-plane to a base-plane, using a flexible material or medium to suspend the touch-plane and define a consistent co-planar resting air gap; to sense and measure any deflection from the co-planar position using any among a broad variety of sensor types.

Four (4) essential components are specified by this invention, a base-plane 32 and a touch-plane 12, separated with a flexible material or medium 22 that defines a co-planar resting position, and an array of sensor pairs 34/35. More explicitly:

Floating Touch-Plane 12: A "touch" surface with a co-planar underside interior surface, and configured with an array of three (3) or more sensor targets 35;

Flexible Mounts 22 which attach and bond the floating touch-plane 12 to, and suspend it over, the base-plane 32 at three (3) or more mounting points, and which establish a consistent co-planar separation (air gap) between said planes. while remaining flexible to enable deflection;

Base-Plane 32 which serves as a firm foundation for all components, and is configured with an array of three (3) or more sensors 34, one adjacent to each mounting point;

Sensor Pairs 34/35 which comprise said sensors 34, closely aligned with said sensor targets 35. These sensor pairs 34/35 serve to monitor changes in the air gap, a virtual, three-dimensional "sensing framework." This class of "air gap" sensor is described as a "non-contact" sensor.

Figure 5:
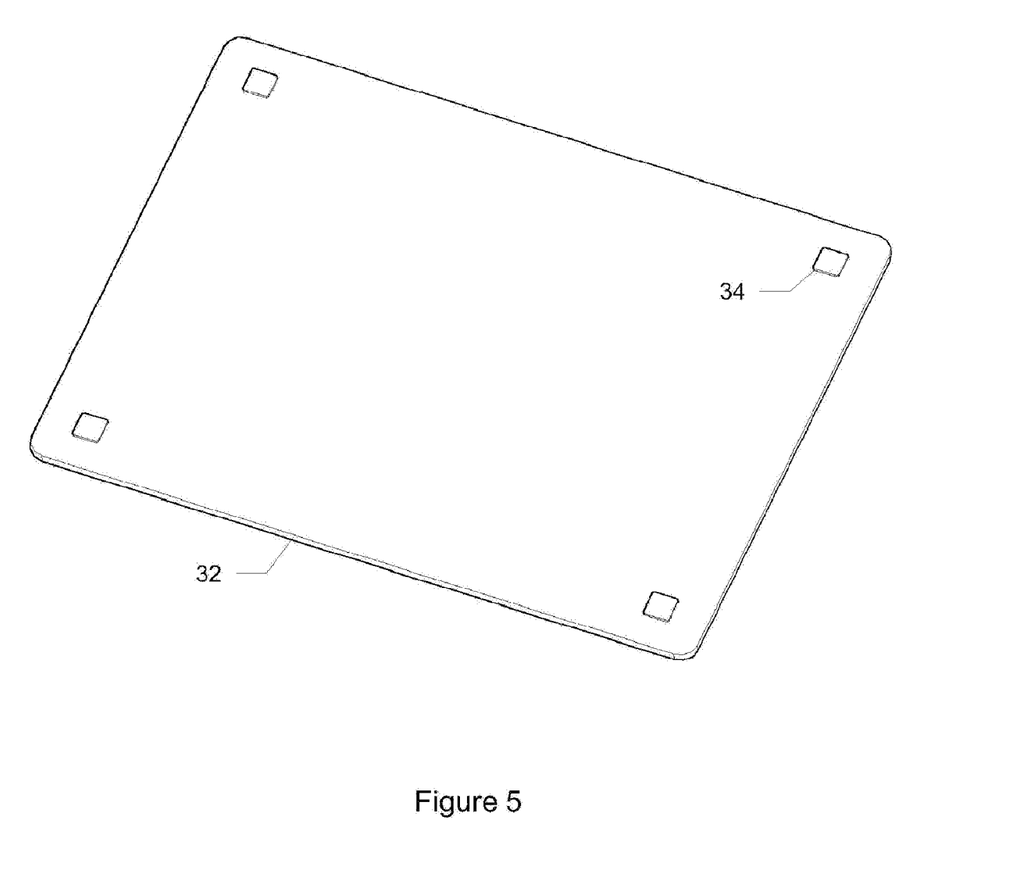
FIG. 5: This drawing illustrates the existing PCBA from a typical LCD assembly, adapted to this application with an array of sensors near the corners, adjacent to nearby mounting points. Many other sensor arrangements are possible within the intent of this invention.
Figure 6:
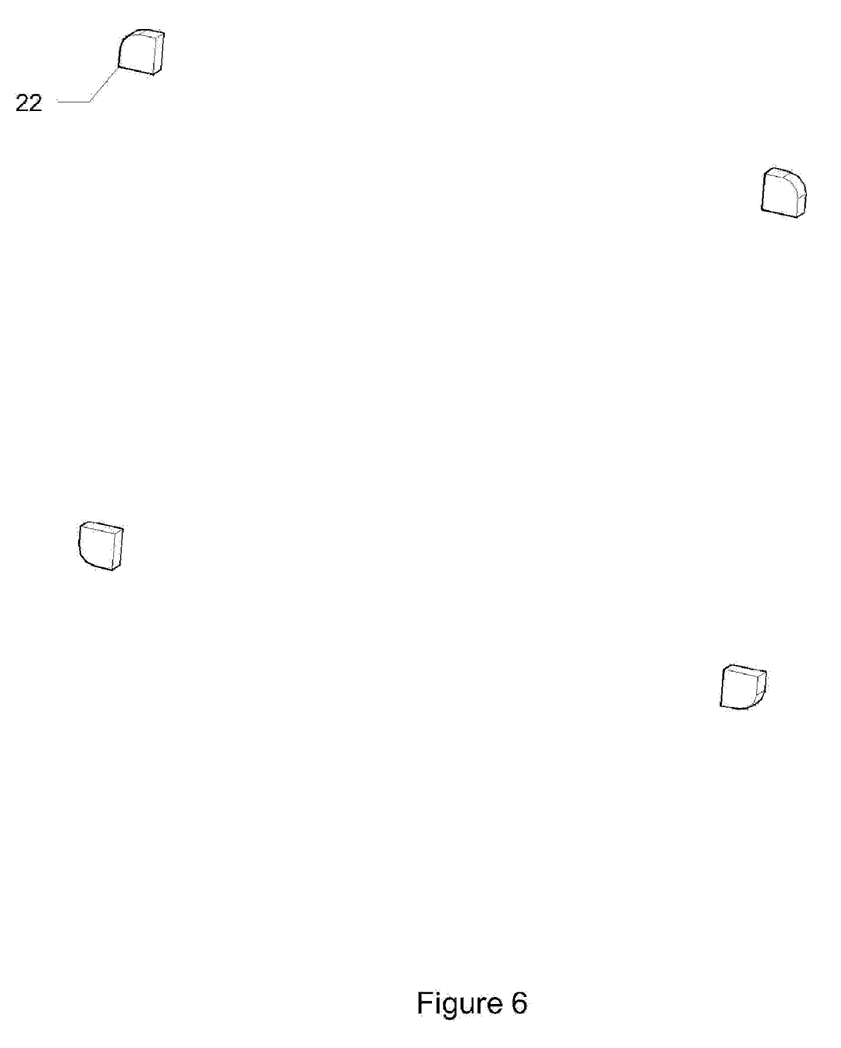
FIG. 6: In isolation view, a representative arrangement of flexible mounts, arrayed as they attach to the earlier depicted LCD/Backlight assembly. Other arrangements can be used within the intent of this invention.

In FIG. 1 the LCD screen is adapted as the touch-plane 12, and the existing PCBA is adapted as the base-plane 32. Flexible mounts 22 define a consistent air gap that separates the LCD/backlight assembly (FIG. 3) from the PCBA (FIG. 5). Any "touch" deflects the touch-plane 12, alters the air gap at all mounting points, and is therefore detected by the sensor pairs. Employing these existing major LCD components is a compelling advantage of this invention.

Figure 3:
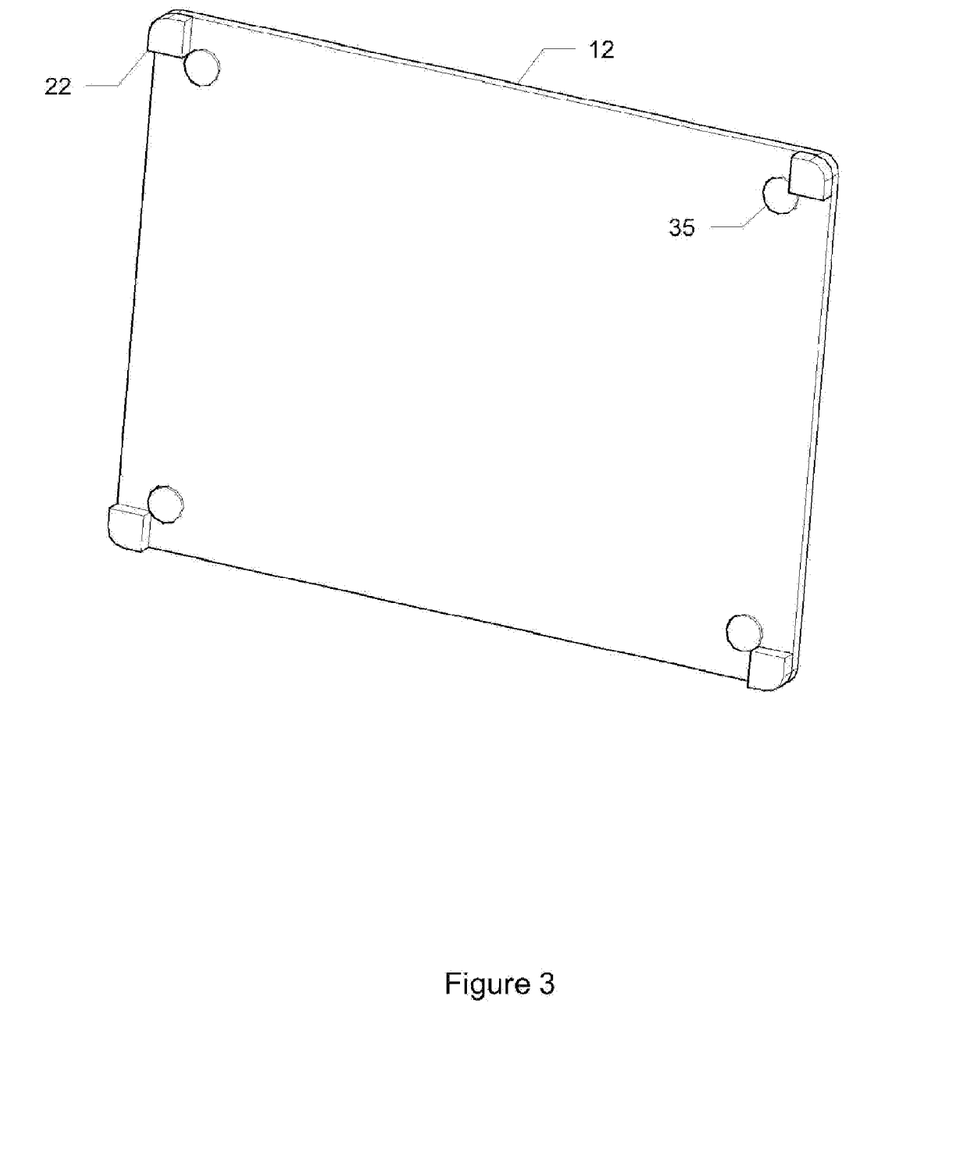
FIG. 3: This view of the LCD/Backlight underside shows arrayed flexible mounts, with adjacent sensor targets. Sensor targets are not required for the capacitive embodiment, but they illustrate one half of the sensor "pair" required by some other sensor types. Other arrangements are possible within the intent of this invention.
Figure 4:
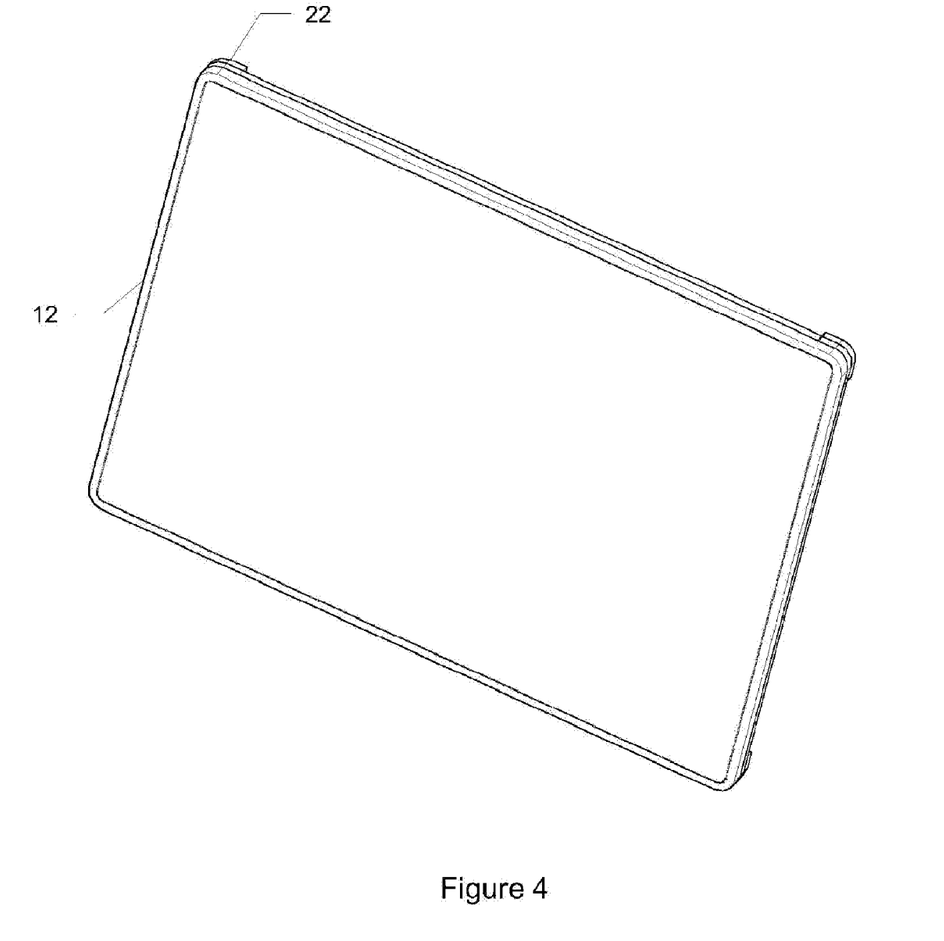
FIG. 4: This view of the LCD/Backlight assembly shows that the perimeter of the display itself is clamped within the surrounding perimeter edges of the backlight enclosure, resulting in a rigidly cohesive twin-plane assembly. This rigid, two-plane assembly is adapted as the touch-plane for this touch screen implementation.
Figure 7:
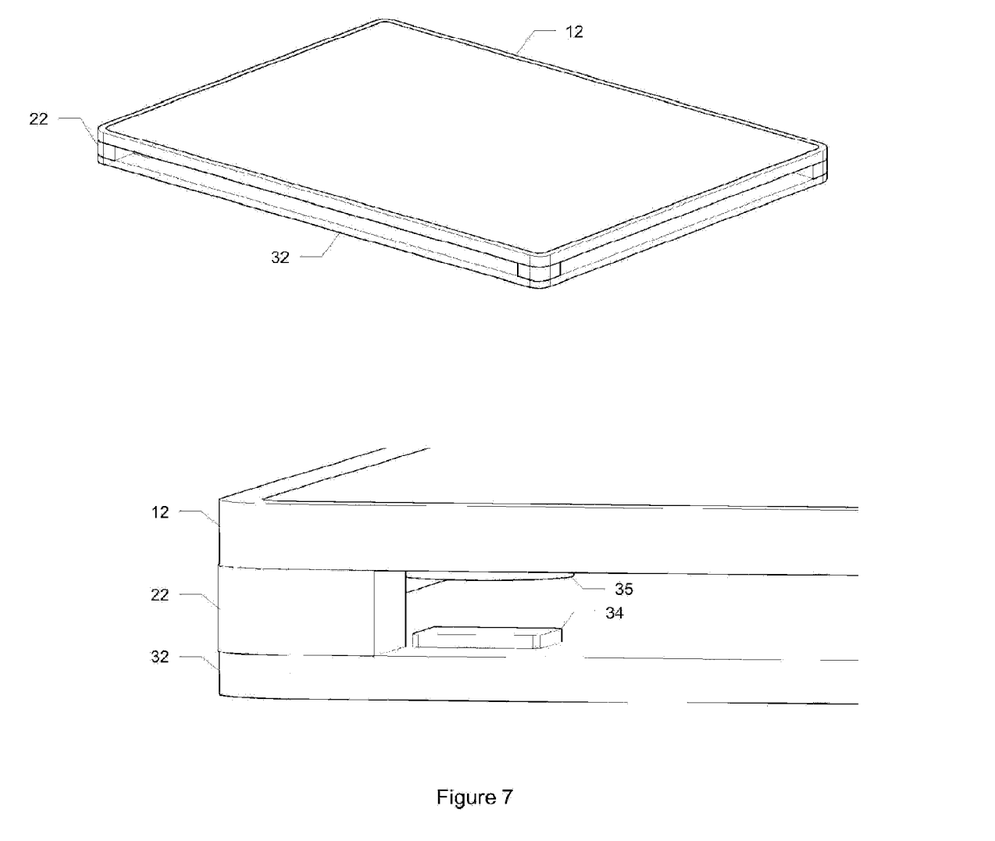
FIG. 7: This dual-view shows a perspective of the complete assembly, following by a typical corner assembly detail. Figure is not to scale but components are shown in a representative arrangement.

The backlight module (FIG. 3) is usually enclosed in a sheet-metal housing, and rigidly fastened to the underside of the LCD module during assembly. Flexible mounts 22 are attached to the underside of this backlight enclosure, one at each corner, which also attach the touch-plane 12 to the PCBA (base-plane 32). FIG. 3 also illustrates sensor targets adjacent to the mounting components. While sensor targets 35 are not used in the capacitive embodiment, many other sensor types do require said targets 35. This invention requires that the touch-plane 12 and base-plane 32 remain co-planar while resting. FIG. 7 illustrates that the LCD assembly (touch-plane 12) must "float" without attaching to or touching any other component of the device, assuring that the touch-plane 12 moves freely in response to pressure on the touch surface. This description of a typical LCD touch screen implementation does not exclude other arrangements, and does not exclude essentially similar implementations with alternate displays (such as a floating CRT), or without any display as a floating touchpad device.

The capacitive sensing grid elements are responsive to "vertical" movements (Z-axis changes) caused by a touch on the floating LCD assembly, and emit a signal proportional to the actual movement. (The word "capacitive" relates to a type of non-contact sensor, not a capacitive film). The basic layout (capacitive embodiment) uses four (4) sensors 34, one at each corner of the PCBA (FIG. 3) to detect movement of the backlight enclosure itself (the underside of the touch-plane 12), and emit a signal proportional to the actual movement. Because capacitive sensors actually detect movement of the touch-plane's underside surface, capacitive "targets" are "virtual" rather than physical. Because other sensor types frequently require physical sensor arrays on both planes, FIG. 3 illustrates a more comprehensive view than just the capacitive embodiment. For this added comprehension, drawings therefore depict four (4) sensor pairs 34/35, showing the target-half of those pairs (targets 35) at the corners of the touch-plane's 12 underside surface (FIG. 2 and FIG. 3), even though such targets are "virtual" for the capacitive embodiment.

In a broader sense, whenever the touch-plane 12 is at rest, the air gap represents a three-dimensional "virtual box" between the touch and base planes, a virtual sensing framework. Any deflection of the touch-plane 12 deforms the side planes of the virtual box. The sensing framework is monitored for any changes using an array of sensor pairs 34/35, illustrated as a sensor 34 on the base-plane 32 and a target 35 on the touch-plane's 12 underside surface. Within the current intent, the sensors and targets can be reversed as to their "hosting" planes.

It is important that any lateral motion is "ignored," so that no error is introduced by lateral friction. When one "touches" any touch surface, it is virtually impossible to only impart a purely vertical motion. X-Y friction is always imparted when a finger (or other object) touches the screen. This novel, "floating" configuration accommodates XY friction and improves detection of the Z-force, thereby improving the accuracy of the resulting data stream. This "motion improvement" is a compelling benefit of the floating touch-plane 12. Appropriate mounting material is a mandate to accomplish this improved accuracy, and ensuring correct mounting material properties is essential to this invention. Certain flexible materials are particularly effective for the task of "floating" the touch-plane 12. This invention therefore specifies certain properties of a flexible material, or medium, necessary to accomplish the goals of this invention, which comprise:

Resiliency: after deformation by a touch-force, the material must "rebound" quickly, with no significant permanent change. Ideally, the material would act as water acts, returning immediately to its original level after a displacing object is withdrawn from a vessel.

Lateral Accommodation: When a force is applied by touching the LCD screen, the flexible mounts 22 respond to the touch by collapsing vertically (Z-axis) and shifting left or right to accommodate the X-Y components of the motion, therefore allowing the sensor to respond only to the vertical component of the applied force.

Adhesion: the mounting material must actually bond the touch-plane (the LCD assembly) to the PCBA, while also accomplishing the two preceding functions, resiliency and lateral accommodation.

It is anticipated that many materials might meet these requirements. The Applicants observe that a low durometer gel-like material (or medium) does exhibit the characteristics necessary to effectively "float" the touch-plane 12. At least two materials possess these essential characteristics, Poron-like or Sorbothane-like types of flexible materials. While these materials exhibit appropriate attributes, Applicants anticipate that other materials or media might accomplish these same requirements, and this invention is not limited to those noted herein.

In regard to sensors 34, many types of non-contact sensors are feasible within the current intent, including capacitive sensors, ultrasonic sensors, Hall effect sensors, light wave sensors, multi-point sensors, and other non-contact sensors. Certain "in-contact" force/displacement sensors could be used, specifically if they are non-load-bearing.

The capacitive embodiment uses one capacitive sensor at each flexible mounting point, with the touch-plane's 12 underside surface serving as a virtual target. This is not to exclude other arrangements, including adding a 5th sensor pair (or more), interior to the perimeter of the LCD assembly, perhaps enabling greater accuracy or additional features. A most basic embodiment could use as few as three (3) flexible mounts with adjacent sensor pairs, and with any number of interior sensor pairs for enhanced performance.

The capacitive sensors used in the capacitive embodiment can be purchased commercially, or fabricated as traces on the PCB, with the underside touch-plane serving as the target 35. Other targeting arrangements include a thin metal or other conductive plate, or flexible circuit added on said underside surface. Absent the backlight, conductive traces can be added on the underside of the LCD itself. More broadly, this invention specifies that sensor pairs must monitor the sensing framework, each pair of which comprise a sensor 34 and target 35, sometimes virtual targets, possibly discrete physical targets like a magnet or a mirror, or perhaps a twin sensor matching its pair-mate. In every case, the current intent is that a vertical motion is detected by variable readings at each of the sensors 34 or sensor pairs 34/35 with the precise location of that touch determined by triangulation software, and the "touch point" being interpreted and reported for a further application response such as an action and/or a screen display.

Another important feature offered over other technologies is broad flexibility in the placement of flexible mounts 22 and sensor pairs 34/35, allowing greater design flexibility, in addition to the size and cost advantages previously noted. Furthermore, since no major components need be added, the touch screen system described in this invention can easily be implemented in very small devices such as cell phones and PDA's.

Operation

In order for the touch screen to be operational, the sensors must connect to a device that decodes the touch and produces the desired result. This is usually done by connecting them electronically with a microcontroller that contains the decoding program, and is capable of invoking a set of software drivers and applications.

When the LCD (top or front plane) is touched with a finger, a pen, or a stylus, the mounting elements deform. As the top plane deflects, the sensors measure the change and send an electronic signal to the microcontroller, which then converts the signal to X-Y coordinates using a standard triangulation method. IBM has published a "force-moment algorithm" that can accomplish triangulation. The location of the touch determines the action to be taken; invoking the appropriate application and producing, in turn, the appropriate feedback. Appropriate feedback may sometimes be a display of ink on the screen at the location of the touch.

We claim:

1. A touch input device, comprising:
   a touch-plane having an exterior touch surface to be locally exposed to a touch or a pressure force, and an underside interior mating surface;
   a base-plane having an exterior supporting surface and an interior mating surface; wherein the base-plane further comprises a foundation plane supporting the input device assembly; a plurality of non-contact sensors which are aligned with opposing sensor targets on the interior mating surface, wherein the plurality of non-contact sensors and opposing sensor targets comprise sensor pairs; wherein said sensor pairs interact in order to measure the separating air gap between them; wherein each sensor pair emits a signal stream of measurements to report air gap changes; and wherein said sensor pairs collectively monitor the virtual sensing framework between said planes; and an array of flexible mounts that bond said interior mating surfaces to each other, creating a consistent co-planar gap between said planes, while said flexibility permits touch-plane deflection under pressure.

2. The touch input device of claim 1 wherein the flexible mounts, comprise:

blocks of specified mounting material that bond the touch-plane to the base-plane;

wherein said mounting material possesses properties of resiliency, lateral accommodation and adhesion;

said blocks are arrayed at a plurality of mounting points, and define a separate co-planar resting arrangement between said planes.

3. The touch input device of claim 1 wherein the sensor pairs comprise an array of active or passive sensors, or targets.

4. The touch input device of claim 1 that detects the presence and location of objects touching the touch-plane, such as a human finger, a pen or a stylus, and generates the same output for all of these objects when they touch a same location with a same force vector.

5. The touch input device of claim 1 wherein the sensor pairs comprise any of capacitive, Hall-effect, light wave, and ultrasonic sensor types.

6. The touch input device of claim 1 wherein the sensor pairs comprise arrays of certain, non-load-bearing sensors.

7. The touch input device of claim 1, wherein three or more co-planar mounts and sensor arrays are co-arranged at either corner mounting points, or interior-plane locations, or in any combination thereof.

8. The touch input device of claim 1, wherein the touch plane comprises a touch screen display device.

9. The touch input device of claim 8, wherein the touch screen display device comprises: a display screen assembly; a protective touch panel attached to the display screen assembly; wherein the assembly is supported on flexible mounts planar to the base plane.

* * * * *